United States Patent  (10) Patent No.: US 6,563,430 B1
Kemink et al.                (45) Date of Patent:    May 13, 2003

(54) REMOTE CONTROL DEVICE WITH LOCATION DEPENDENT INTERFACE

(75) Inventors: Joost Kemink, Campbell, CA (US); Yevgeniy Eugene Shteyn, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/210,416

(22) Filed: Dec. 11, 1998

(51) Int. Cl.$^7$ ................................................ G08B 5/22
(52) U.S. Cl. .............................. 340/825.49; 340/825.72
(58) Field of Search .................. 340/825.49, 825.69, 340/825.72, 310.01; 725/37; 345/156, 173, 702, 835, 157

(56) References Cited

U.S. PATENT DOCUMENTS

| | | | |
|---|---|---|---|
| 5,101,191 A | * 3/1992 | MacFadyen et al. | 340/310.01 |
| 5,109,222 A | * 4/1992 | Welty | 340/825.72 |
| 5,552,806 A | 9/1996 | Lenchik | 345/156 |
| 5,642,303 A | 6/1997 | Small et al. | 364/705.05 |
| 5,767,919 A | * 6/1998 | Lee et al. | 725/37 |

FOREIGN PATENT DOCUMENTS

| | | | |
|---|---|---|---|
| EP | 0626635 | 11/1994 | G06F/3/00 |
| EP | 0801342 | 10/1997 | G06G/3/023 |

* cited by examiner

Primary Examiner—Michael Horabik
Assistant Examiner—William Bangachon
(74) Attorney, Agent, or Firm—Gwenaelle LePennec

(57) ABSTRACT

A user control interface is provided that is location dependent. Context control parameters are associated with location, and the user control interface is customized to the context within which the device is being operated. The control interface includes the presentation of context sensitive information and the communication of corresponding context sensitive user commands via the interface. The location determination is effected using any number of commonly available techniques, such as direct entry, infrared sensors and active badges for relative positioning, as well as the conventional absolute positioning devices such as LORAN and GPS. Preferably, the device communicates with a remote information source that provides the context sensitive control information. The remote information source may be a home network server, an Internet server, a public service network, or other communication network.

18 Claims, 4 Drawing Sheets

REMOTE CONTROL DEVICE WITH LOCATION DEPENDENT INTERFACE

FIELD OF THE INVENTION

This invention relates to the field of data communications and control and in particular to the field of handheld and mobile control devices.

DESCRIPTION OF RELATED ART

The use of handheld electronic devices for controlling other devices is becoming increasingly common. Consumer electronic devices, such as televisions and stereos, are controlled with remote control devices, and "universal" (user-programmable) remote controllers are available for controlling multiple consumer electronic devices. Each of these devices typically has a user interface that is optimized for the tasks that the device is expected to perform. For example, a television remote control has channel and volume controls; a tape deck remote control has fast-forward, play, record, and rewind controls; and so on. The aforementioned "universal" controller, however, contains a myriad assortment of controls to facilitate the control of a variety of devices.

Because a universal controller is designed to operate many varied devices, it is often difficult to use because of the large number of control buttons or switches. Often, a user may only have two or three of the possible devices that the universal controller can control, and many of the buttons on the universal controller are unused. In like manner, the user may have many of the devices that the universal controller may control, but they may not necessarily be located in a common area within the sphere of control of the universal controller.

The use of handheld electronic devices for managing information is also becoming increasingly common. Portable "palm-top" information processing devices are commonly used to organize, record, and present data and information. For example, electronic "day-timers" are used to record scheduled appointments and events in a calendar format, and to operate as an alarm clock to remind the user of these appointments and events as their schedule time arrives. Electronic notepads are used to record and present telephone lists, shopping lists, notes, recipes, and so on. Personal navigation devices are available that illustrate the location of the device on a presentation of a street map.

U.S. Pat. No. 5,642,303 relates to configuring a time- and location- based computing infrastructure. U.S. Pat. No. 5,642,303 addresses the problem of how to pro-actively remind people of tasks to do. A system is disclosed that uses unique radio frequency (RF) beacons in key locations, for example, one in a home, another beacon in an office, yet another beacon in a car, and so on, to notify a portable information processing device of its proximity to each location. The information processing device is programmed to supply location-dependent reminder messages in dependence upon the receipt of each recognized RF beacon.

U.S. Pat. No. 5,552, 806 relates to an apparatus for positioning selectable function icons on a display. Again, the function icons displayed are determined by a locale dependent radio signal indicating, e.g., the home locale, the work locale or a mobile locale. In the home locale, for example, the user him/herself has to navigate through the hierarchy of icons available in this specific locale.

BRIEF SUMMARY OF THE INVENTION

Although the prior art devices mentioned above provide a mechanism to select locale dependent icons, it does not solve the problem mentioned above, where the user has to either juggle a (too large) number of remotes or has to navigate through a hierarchy of control layers, all associated with, e.g., the home environment or the office environment, in order to find the appropriate control level. It is therefore an object of this invention to provide a device user interface that is optimized, or customized, for the function that the device is intended to perform within the home, or within the office. It is a further object of this invention to maximize the functions that the device may perform, thereby providing maximal utility to a user with a minium of user-interaction.

These object and others are achieved by determining the control functionality of a user interface based upon the context within which the device is being used. Context parameters are associated with location relative to the home environment, and a device in accordance with this invention provides a control interface that is modified and optimized in dependence upon location and other parameters. The interface includes the presentation of context sensitive information and the communication of context sensitive user commands and information via the interface. The location determination is effected using any number of commonly available techniques, such as infrared sensors and active badges for relative positioning, conventional absolute positioning devices such as LORAN and GPS, as well as the beacon sensing devices disclosed in the aforementioned U.S. Pat. No. 5,642,303, the contents of which are incorporated herein by reference.

In a preferred embodiment, the device communicates with a remote information source that provides the context sensitive control information in dependence upon a location parameter that is communicated from the device. The remote information source may be a home network server, an Internet server, a public service network, or other communication network.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
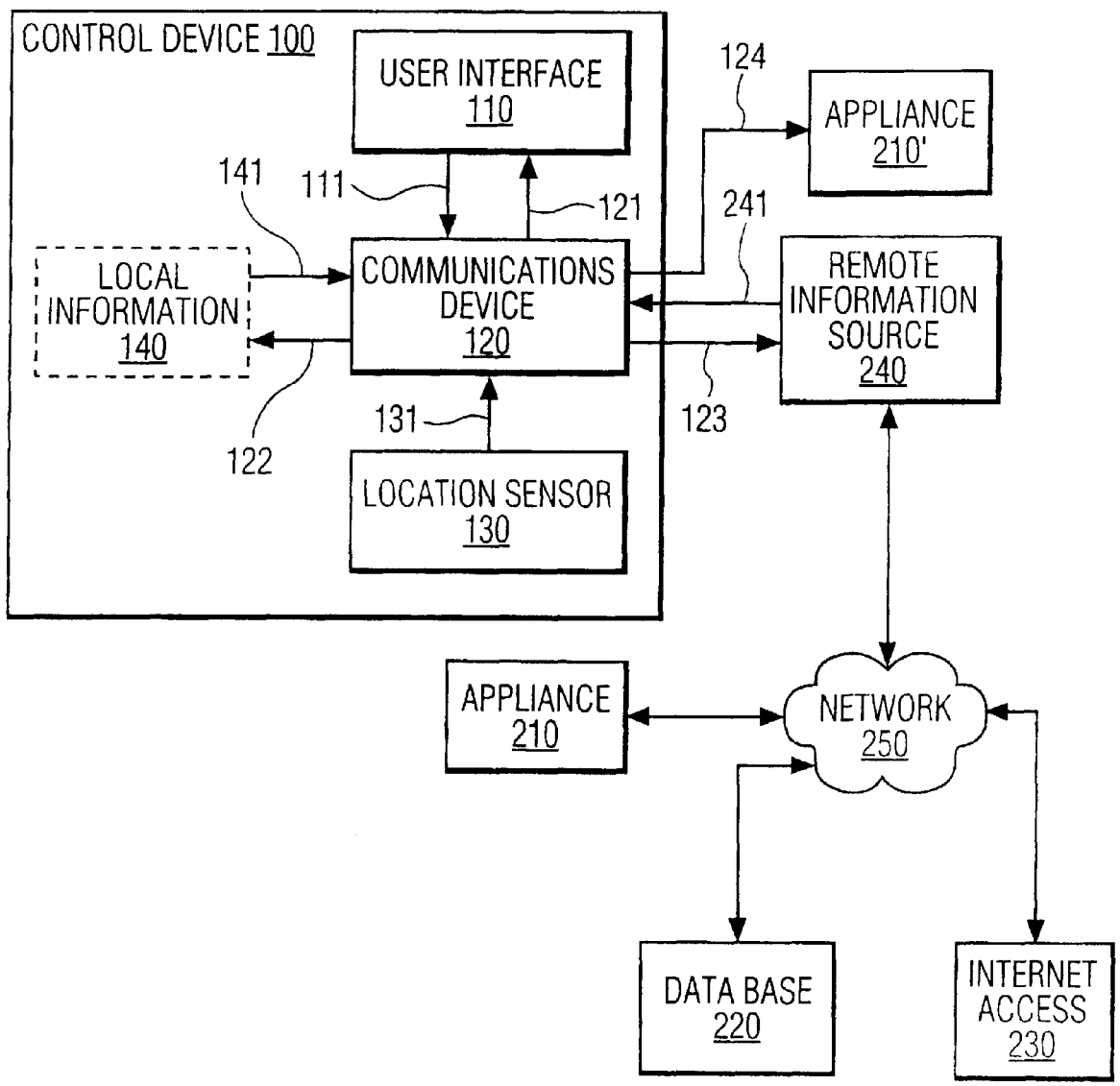
FIG. 1 is a block diagram of a control system in accordance with this invention.

FIG. 1 is a block diagram of a control system according to the invention. The control system includes a control device 100, one or more appliances 210, and one or more information sources 140, 240. The example control device 100 includes a user interface 110, a communicator 120, a location sensor 130 and an optional local information source 140. The communicator 120 provides a communications path 123, 241 with a remote information source 240. In accordance with this invention, the communicator 120 provides context sensitive information 121 to the user interface 110 for presentation to the user of the control device 100. The location sensor 130 provides a location parameter 131 to the communicator 120, and the communicator 120 receives information 141, 241 from the local 140 and remote 240 information sources respectively, based on this location parameter 131. The location parameter 131 may be an absolute location coordinate, such as a latitude and longitude, or a relative location, such as within the vicinity of a known location coordinate, or a descriptive location, such as the name of a location. The location parameter 131 is used to establish a context within which the control device 100 is being operated. For example, the control device 100 can be expected to be used in a different context in one room of a house, such as a kitchen, than another room, such as a bedroom, because the tasks that are typically performed in one room are different from the tasks typically performed in another room.

Figure 2:
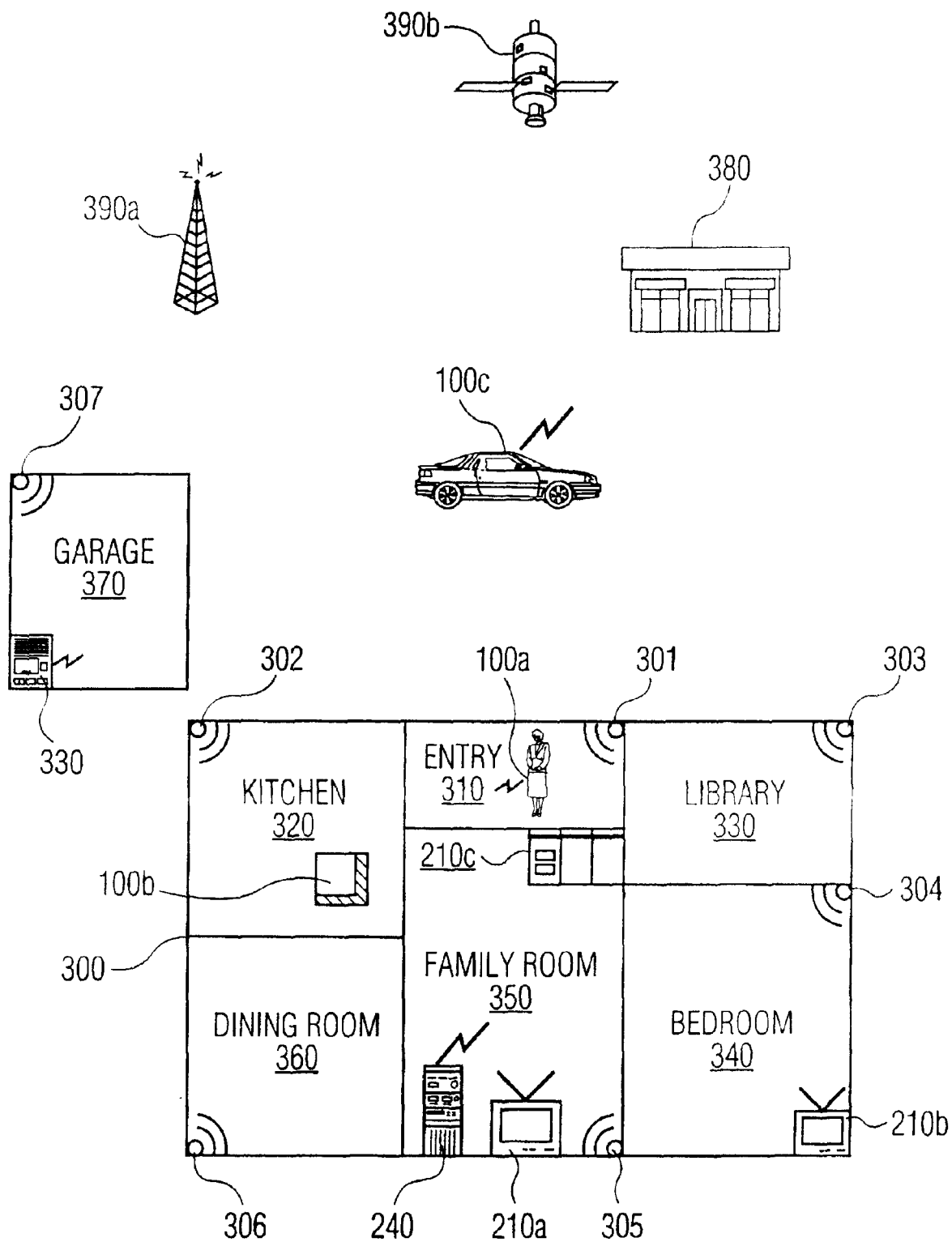
FIG. 2 is a diagram of an implementation of a context sensitive control system in accordance with this invention.

The operation of the control device 100 is best illustrated by example. FIG. 2 illustrates an example implementation of a context sensitive control system in accordance with this invention. FIG. 2 illustrates three control devices 100*a*, 100*b*, and 100*c*. The control device 100*a* is a portable device that is carried by a user. As the user enters the house 300, the location sensor 130 in the control device 100*a* detects an emission from an emitter 301 that is mounted in the entry area 310. The location sensor 130 in the control device 100*a* notifies the communicator 120 in the control device 100*a* that it is in the vicinity of the emitter 301 that is associated with the entry area 310. Knowing that the user is in the entry area 310, the communicator 120 in the control device 100*a* queries one or both of the information sources 140, 240 for control information that is associated with, or context related to, the entry area 310.

In this example, assuming that the house 300 is automated, the information sources 140, 240 communicate the automation commands and the associated menus or other user interface elements that are appropriate to the automation. For example, the information sources 140, 240 may communicate a list of lights that are remotely controllable by the control device 100*a*, or more appropriately, a list of the lights that are in the vicinity of the entry area 310. The communicator 120 in the control device 100*a* relays this information to the user interface 110 in a form that facilitates the control of these lights by the user, for example by providing the list on a touch sensitive pad, wherein the user turns the lights on and off by touching the area on the pad corresponding to the particular light in this list. In a graphics based system, the information sources 140, 240 may communicate a floor plan diagram, and the user turns lights on and off in a room by touching the room area in the floorplan that is displayed on the interface 110. The location parameter 131 may also include an orientation of the control device 100, so that, for example, options are provided for lights or appliances that are in the orientation direction from the control device 100. Techniques for presenting text, drawings, and associated options are common to one of ordinary skill in the art, and include for example, the hypertext markup language, HTML, that is used to display pages of information with links to other information or processes. Note that, in this example, until the control device 100*a* is located in the entry 310, the user interface 110 of the control device 100*a* is not encumbered by the list of lights or the floorplan diagram.

The local and remote information sources 140, 240 may also provide information regarding electronic appliances 210, such as televisions, computers, and music systems, that may be controlled via a home networks, such as HAVi, X-10, Home API, IEEE 1394, and the like, or via other networks, using for example TCP/IP, SCSI, or other standard interfaces and protocols. Consistent with the terminology used in such networks, the term appliance is used herein to include any controllable item. The options of each appliance 210 on the network that are appropriately controllable from the entry area are communicated by the information source 240, via link 241, to the communicator 120 of control device 100*a*. For example, a television appliance 210*a* that is in the adjacent family room 350 may be appropriately controlled from the entry area 310, but not the television appliance 210*b* that is in the bedroom area 340. In this example, the communicator 120 of the control device 100*a* presents a menu of options for the television appliance 210*a* to the user, via the user interface 110. These options may be mere button selections, emulating a conventional television remote controller, or may include more meaningful information. Assuming, for example, that the information source 240 has access to an electronic television program guide, via for example an Internet connection 230, the names of each program currently available for viewing on the television appliance 210*a* may be presented to the user for selection via the user interface 110 of the control device 100*a*. Similarly, the titles of each CD, or of each song on each CD in a music appliance 210*c* may be presented for selection by the user.

Subsets of menus of options may also be provided. For example, if the television appliance 210*b* in the bedroom 340 is turned on when the user is at the entry 310, the control device 100*a* may present the user the option to turn the television 210*b* off before exiting the house 300. Other options for the television 210*b*, such as channel selection, need not be presented if the user is in the entry area 310, or if the television 210*b* is not turned on. Similarly, global or group options may be presented to a user in the entry (exit) area 310, such as an option to turn off all appliances, or turn off all predefined appliances in a list, and so on.

The context of a control device 100 may be based upon other parameters as well. For example, the context may be dependent upon the prior location(s) of the control device 100, so as to distinguish, for example, between an entry or an exit. Likewise, it may be dependent upon other external parameters, such as the time of day, the time of the year, and the like. For example, the option to turn on particular appliances, such as lights or televisions, may not be presented during particular temporal periods. In such an embodiment, for example, the list or diagram of lights might only be presented during hours of twilight or darkness, seasonably adjusted. The context may also be dependent upon other external objects as well. For example, the state of a switch on an entry door, or a motion detector outside the door, may be used to determine whether the user is leaving or entering the home, and different options would be presented in each case. The context may also be dependent upon the presence of other users of control devices 100. For example, the option to turn off an appliance in another room may be omitted if another user is in the other room, or the option may include a notification that the other room is occupied and issue an "are your sure?" query to confirm the turning off of the appliance.

In accordance with another aspect of this invention, the control device 100*a* may effect predefined context-sensitive default control actions, such as turning on a preset list of lights when the control device 100*a* first reports that it is in the entry area 310, and turning off a preset list of lights and appliances when the control device 100*a* reports an exit from entry area 310.

The control device 100*a* may also effect state dependent context sensitive actions. For example, if the prior state of the control device 100*a* is that it is located in the family room 350 and the television appliance 210*a* is tuned to a particular channel, and the next state is the reported presence of the control device 100*a* in the bedroom 340, the control device 100*a* may automatically turn on the television appliance 210*b*, tune it to the particular channel, and subsequently turn off the television appliance 210*a*. As would be evident to one of ordinary skill in the art, this sequence may also be dependent upon the time of day, such that the television appliance 210*a* in the family room 350 is only turned off automatically if the time is later than, for example, 10 p.m. In either event, the control device 100*a* will thereafter present control options relative to the television appliance 210*b* in the bedroom 340, rather than television appliance 210*a* in the family room 350, or with a reduced set of options for the television appliance 210*a* in the family room 350, such as volume control and power.

In accordance with another aspect of this invention, the context sensitive information provided by the communicator 120 of the control device 100*a* may also be dependent upon the particular user of the control device 10*a*. For example, the associated user of control device 100*a* may have particular preferences with regard to channels or programs to watch on the television appliance 210*a*. In this example, the aforementioned list of channels or names of programs presented to the user for the television appliance 210*a* will be filtered to only provide those of interest to the particular user, or sorted to provide the entire list, but in the order of the particular user's preferences.

As the user enters each area 310, 320, 330, 340, 350, and 360 of the house 300, the control device 100*a* detects emissions from corresponding emitters 301, 302, 303, 304, 305, and 306. In a preferred embodiment, to limit the field of emissions to each area within a home, the emitters 301–306 are infrared emitters, each sending a respective signal having a unique pattern that is identifiable by the location sensor 130. In like manner, emitter 307 is associated with the garage area 370. The uniquely identifiable pattern of each signal of each emitter 301–307 serves as the location parameter that is communicated from the location sensor 130 to the communicator 120. If the control device 100*a* includes a local information source 140, the association between the identified emitter 301–307 and the physical locale 310–370 is effected within the control device 100*a* so that the appropriate information 141 corresponding to the location 310–370 is provided If the control device 100*a* does not include a local information source 140, the association between the identified emitter 301–307 and the physical locale 310–370 may be effected in the remote information source 240. That is, the communicator 120 relays the location parameter 131 from the location sensor 130 to the remote information source 240, via link 123, and the remote information source 240 is preprogrammed to extract the context sensitive information 241 based upon the location parameter 131. In like manner, the user may be provided the option of entering the location parameter 131 directly, thereby eliminating the need for beacons in all or some of the locations. For example, the user interface 110 may provide a "location" option, wherein the user selects from among a predefined list of named locations; alternatively, the control device 100 could contain a voice recognition device, and the user could say the name of a location, such as "kitchen", "master bedroom", etc., that is used by the location sensor 130 to determine the location parameter 131. Similarly, the location sensor 130 could contain a relative location sensing device such as accelerometer that is used to determine the movements of the control device 100 relative to a predefined reference point, such as the location of a recharging station for the control device 100. In such an embodiment, the sensor 130 determines the location parameter 131 based on movements relative to the reference point. If the location sensor 130 is an absolute positioning device, such as a GPS device, the information source 140, 240 in a preferred embodiment contains a "map" of bounding polygons that associates a geographic coordinate to the physical locale 310–370 containing this coordinate. These and other techniques for determining or defining a location parameter 131 and associating it with a physical area or region are common to one of ordinary skill in the art.

The aforementioned filtering of the context sensitive information 241 based upon other context parameters such as the particular user, the time of day, and the like may be effected in the communicator 120 or in the remote information source 240. In the preferred embodiment, the remote information source 240 contains a rules database that determines the information 241 to be communicated to the user via the user interface 110 based upon the location parameter 131 and other context determining parameters, while the communicator 120 controls the flow and format of the information and control signals 111, 121, 122, 123, 124, 131, 141, and 241 among the components. Other mechanisms for choosing the information that is to be communicated based on a location parameter 131 would be evident to one of ordinary skill in the art.

The control device 100 of FIG. 1 effects the control of remote devices in a variety of manners. In a preferred embodiment, control is effected via a network 250 that interconnects the controlled devices and information sources. The user communicates commands 111 via the user interface 110 to the communicator 120, and these commands or their operational equivalents are communicated to the remote information source 240 via the link 123. Illustrated in FIG. 2 is a relay device 330 that relays information to the remote information source 240 from a control device 100, thereby extending the range of communications between the control device 100 and the remote information source 240. In this preferred embodiment, the remote information source communicates the necessary control commands over the network 250 to effect the control of the appliances 210 that are on the network 250. For example, to reduce complexity at the control device 100, the remote information source 240 communicates the context sensitive information 241 to the user via an indexed list, or an indexed diagram. When the user selects a user option associated with the context sensitive information 241, only the index of the selected item in the list or diagram is communicated as an operational command from the communicator 120 to the remote information source 240. The remote information source 240 then executes the control commands that correspond to the communicated operational command from the communicator 120 to effect the selected option. For example, in accordance with the Home API standard, to change the channel of a television appliance 210*a* to channel 8, the Basic command would be in the form:

GetObject("home:family room"). Channel=8.

Other standards and protocols provide similar control commands, and would be familiar to one of ordinary skill in the art. Alternatively, in a hypertext, HTML, or similar environment, the selection of an item on the HTML page that is presented to the user interface 110 effects a communication of the commands that are associated with the selected item in the HTML document, for example, commands to execute a program that contains the above Basic command.

In addition to the control of appliances via the network 250, the preferred embodiment of the control device 100 also includes the ability to remotely control devices directly. Illustrated in FIG. 1 is an appliance 210' that is not connected to the network 250. The example communicator 120 of the control device 100 includes a transmitter for communicating operational commands 124 directly to the appliance 210'. In a preferred embodiment, the transmitter is an infrared transmitter commonly used in the aforementioned universal remote controllers. Other communications means, such as a radio or wired connection would be evident to one of ordinary skill in the art. The commands and format for the communication of operational commands 124 that are associated with the particular appliance 210' are contained in the local 140 or remote 240 information sources. In accordance with this invention, these commands are communicated to the communicator 120 when the control device 100 is brought into the vicinity of the appliance 210', as determined by the location parameter 131.

Note that although the invention presented herein is particularly well suited for a user interface 110 that includes a modifiable display of information, the principles of this invention are applicable to control devices that do not have displays. For example, the control device 100 may include a variety of buttons, similar to a universal remote controller. As is common in the art, a conventional universal remote controller is programmed to control a particular brand of television, a particular brand of VCR, and so on. If a user has multiple televisions located throughout the house, of differing brands, a conventional universal controller cannot be carried from room to room and used to control each television, because the remote commands and format of a television in one room may not be the same as the remote commands and format of a television in another room. In accordance with this invention, however, as the user travels from room to room, the control device 100 will automatically receive the remote commands and format that are appropriate to the particular television in each room from the information source 140, 240. In this manner, for example, pressing a "channel up" key on the control device 100 will effect an increment of the tuned channel on the television that is in the vicinity of the control device 100, even though each different television throughout the house may have a different command or format for incrementing the tuned channel. That is, by storing the appropriate operational commands and formats for each option of each appliance in a local 140 or remote 240 information source, and associating the options or a subset of the options of each appliance to particular locations, the control device 100 can be reprogrammed to effect each option, in dependence upon its location.

Figure 3:
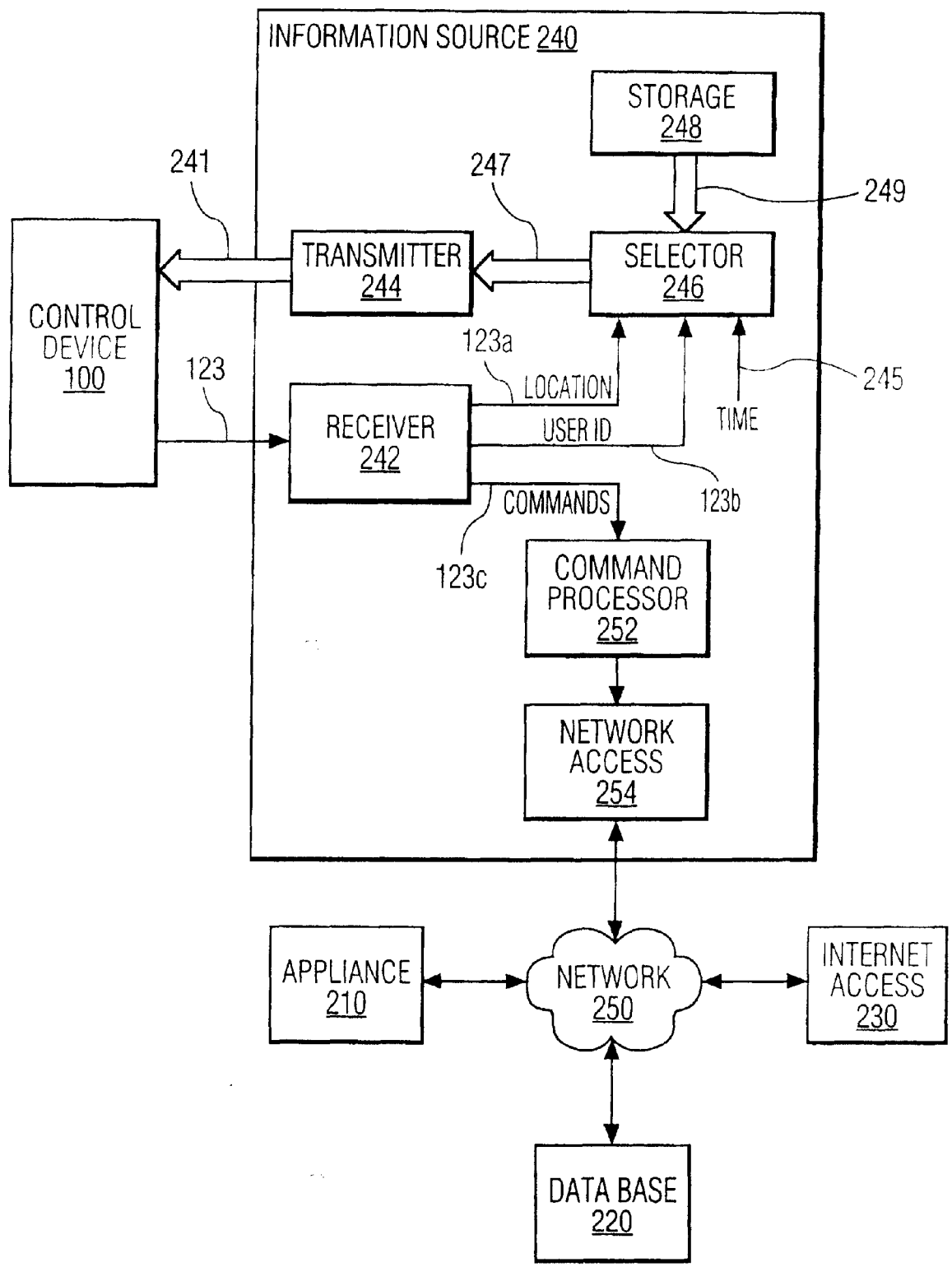
FIG. 3 is a block diagram for a remote information source in accordance with this invention.

FIG. 3 illustrates an example block diagram for a remote information source 240 in accordance with this invention. The remote information source 240 includes a receiver 242, transmitter 244, selector 246, storage 248, and an optional command processor 252 and network access device 254. The receiver 242 receives communications 123 from the control device 100; these communications include location information 123 a and optionally based on a user identification 123b and operational commands 123c. The selector 246 selects a subset 247 of information 249 from the storage 248, based upon the location information 123a, and optionally the user identification 123b and other parameters such as a temporal parameter 245. The selected information 247 is communicated to the control device 100 as context sensitive information 241. In a preferred embodiment, the information source 240 includes a network access 254 for communicating with the network 250. Operational commands 123c from the control device 100 are processed by the command processor 252 to provide control commands for appliances 210 on the network 250, as discussed above. As would be apparent to one of ordinary skill in the art, the storage 248 may be located on the network 250 as a separate database 220, or at one or more locations accessible via the Internet access 230 of FIG. 1.

Figure 4:
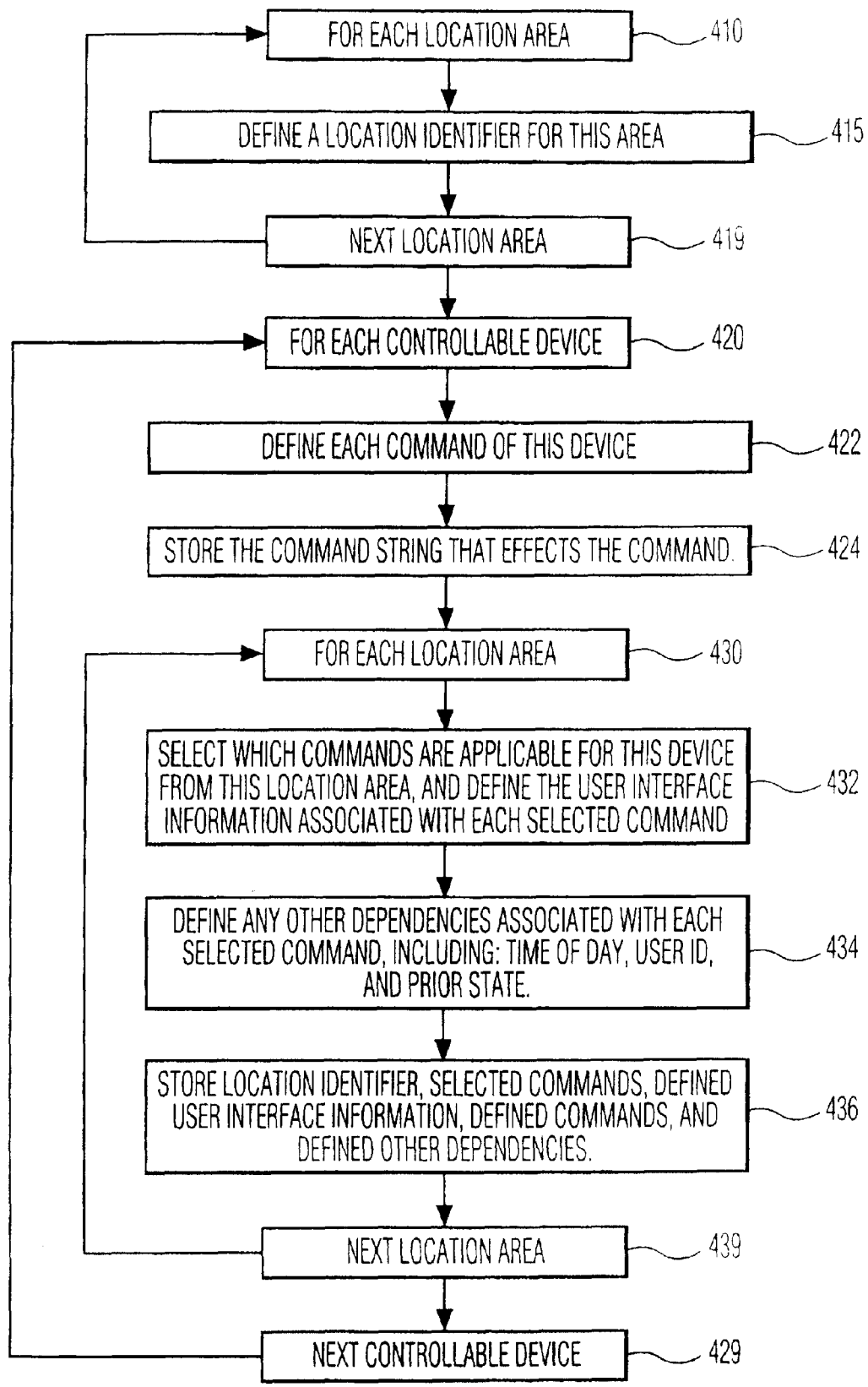
FIG. 4 is a flowchart for storing context dependent control information at an information source in accordance with this invention.

FIG. 4 illustrates an example flowchart for storing context sensitive information in an information source 240. Each location area is identified in the loop 410–419. For example, in the house 300 of FIG. 3, areas 310–370 are identified as distinct areas, and the unique emission patterns of the signals from the emitters 301–307 corresponding to each of these areas are identified. In like manner, the association of the names of locations in the aforementioned voice recognition location determination means are associated with corresponding areas 310–370 in the loop 410–419. Note that there need not be a direct correspondence between the number of rooms in the home and the number of emitters or names of locations. For example, some rooms may not have emitters. In this case, the absence of an identifiable emission will establish a context which, for example, only provides options to the user interface 110 to turn off the appliances in other rooms. In this manner, for example, a bedroom that has no appliances need not be configured to contain an emitter, yet the control device 100 will still have the ability to receive context sensitive information and to control appliances.

Each controllable device is then entered into the information source via the loop 420–429. By collecting and processing the information for each controllable device, additional controllable devices can be easily added by merely repeating the steps within the loop 420–429. The commands, or options, of the controllable device are identified at block 422. For example, a television may have a channel up command, a channel down command, a volume up command, a volume down command, and so on. Associated with each defined command at 422 will be a sequence of data, commonly called a command string, that causes the controlled device to perform the command function; these command strings are defined at 424.

For each location area that was defined in the loop 410–419, the set of commands for the controllable device being processed are defined, in the loop 430–439. Consider, for example, the aforementioned television appliance 210a that is located in the family room 350 of FIG. 2. Within the family room location area 350, full control of the television appliance 210a is appropriate; within the bedroom 340, however, perhaps the only options that are appropriate are power and volume commands. Similarly, from the library area 330, no options for control of television appliance 210a may be appropriate. At block 432, the controllable device options that are to be provided at each location area are selected. Associated with each device option will be the user interface information that is provided to the user for that option, for example, the functional name of the command, or an easily recognizable symbol. The same device option may have different user interface information depending upon location area. For example, when the control device 100 is located in the family room, the user interface information associated with the power control of the television appliance 210a may be a simple "TV on/off" message. When the control device 100 is brought into the bedroom 240, however, the message for the same power control of the television appliance 210a may be a "Fam TV on/off" message, to distinguish the television appliance 210a in the family room from the television appliance 210b in the bedroom 240. In a graphics based system, the user interface information may also contain coordinate information for the placement of the corresponding control area on the user interface 110. These and other methods of communicating information for a user interface are common to one of ordinary skill in the art. Note that some of the context sensitive information need not be directly related to a controllable device option; the context sensitive information may be, for example, the status of a controllable device, without necessarily providing the user the option to effect a change in that status from different locations. Such information would be defined in block 432 and associated with a null command.

Other dependencies associated with each selected command are defined, at block 434. Such dependencies, for example, include a definition of time periods when the selected commands of block 432 should or should not be presented to the user. In like manner, selected commands may be specified to be included or excluded from a particular user's control device, or presented differently to different users. In a preferred embodiment, sequences of actions or conditions may be specified to determine whether or not to present the selected command to the user. For example, presenting an option to turn off the bedroom television appliance 210*b* when the control device is located in the garage 370 may be dependent upon whether the device had previously been located in the entry 310, implying a departure, rather than an arrival. As would be obvious to one of ordinary skill in the art, other presentation options, such as the order in which options appear, their format and visual attributes, and the like, may also be included in the user interface information of blocks 432 and 434.

At 436, the above defined and determined information is stored, using the location identifier as a locator for this information, thereby allowing for a rapid retrieval of the information appropriate to a determined location based upon a receipt of the location parameter 131 from a control device 100. Alternative methods of storage will be evident to one of ordinary skill in the art. For example, each of the above defined interface information items may be treated as a context sensitive message having one or more associated location regions. Each time a control device 100 reports a location parameter 131, each of the messages are checked to determine whether the location parameter 131 is within its associated location region. If the location parameter 131 is within its associated location region, the message is communicated to the control device 100. Time dependent information items will be added or deleted from the collection of context sensitive messages based on the time of day and the conditions of the dependency defined in block 434.

The control device 100 may be implemented in a variety of forms. Illustrated in FIG. 2 is a control device 100*b* in a kitchen 320. The control device 100*b* may be implemented, for example, as a counter-top unit with a user interface 110 that can be viewed from a distance, and controlled via voice commands. Being informed that the control device 100*b* is in the kitchen 320, the information source 240 provides, for example, an option to select recipes. Associated with each recipe could be an audio or video clip, allowing the user to receive instructions while preparing the meal; control options such as play, rewind, pause, and the like would be provided for such clips, using for example the aforementioned voice command input. As would be evident to one of ordinary skill in the art, additional features could also be provided, such as an interface between the recipe application and the control of an oven for preheating, automatic shutoff, and the like. Also as would be evident to one of ordinary skill in the art, for a semi-portable control device 100 such as a counter-top control device 100*b*, the location sensor 130 can be a conventional input device with which the user manually enters the location parameter 131, such as a code that is associated with the kitchen area 320.

In a similar manner, referring to the example illustration of FIG. 2, a user may have a control device 100*c* in an automobile. The control device 100*c* communicates with the remote information source 240 via relay devices such as a ground 390*a* or satellite 390*b* communications system. In addition to providing location dependent information to the control device 100*c*, the information source 140, 240 may also effect a change in the allowable mode of operation of the control device 100*c*. For example, for safety, the control device 100*c* may be automatically configured to present information using voice prompts, and receive commands from the user via voice input. The control device 100*c* may also effect a change of modality based also on whether the automobile is in gear or not, so that a user is afforded the option of a text based interface when the automobile is parked, but not while it is being driven. As would be evident to one of ordinary skill in the art, the modality may also be controlled based upon whether the user is the driver or the passenger in the vehicle.

The foregoing merely illustrates the principles of the invention. It will thus be appreciated that those skilled in the art will be able to devise various arrangements which, although not explicitly described or shown herein, embody the principles of the invention and are thus within its spirit and scope. For example, multiple information sources 240 may be provided. An information source 240 may, for example, contain a user's personal data and information, another may contain the user's business data and information, another may contain public service information, another commercial information, and so on. The user may be provided the option of selecting one or more information sources for receiving context sensitive information. For example, while driving the automobile, the user interface 110 of the control device 100*c* may present a list of restaurants in the vicinity, and selecting one from the list may effect a telephone call, facsimile, or e-mail to the restaurant to secure a reservation. In like manner, a control device 100 need not be a personal device, per se. Control devices 100 may be placed, for example, at airports and train stations. A user will log into the control device 100, for example by providing an identification card, and the information source 240 will be informed that this user is at the location of this control device 100. In response to the user identification and location parameters, the information source will provide the appropriate context sensitive information, for example messages related to the user's purpose of being at the airport, options to rent a car at the destination location, the status of appliances and security devices at home, and so on, and then accept commands based upon this context sensitive information.

The partitioning of functions in the example block diagram of FIG. 1 is presented for illustration purposes only. As would be evident to one of ordinary skill in the art, the functions presented can be implemented in hardware, software, or a combination of both, and may use other functional components to optimize performance. For example, the user interface 110 may be separated from the communicator 120, and communications provided via an infrared link. In another example, the video control device 100 may be a set-top box, wherein the user interface 110 includes an interface to a television. In this embodiment, the user of this device may view the status of all the controllable appliances in the house from a distance, and control each of these appliances using a hand-held remote, or by using voice commands. These and other configurations will be evident to one of ordinary skill in the art and well within the spirit and scope of this invention.

A further enhancement of the embodiments of the invention given above is that 210 controllable appliance is at least partly comprised in control device 100. For example, control device 100 comprises communication software/hardware components representing, e.g., a modem. Entering different locations or zones the control device 100 switches the usage (frequency, speed, etc..) and representation of the modem. In addition control device 100 comprise both IR and RF emitters/receivers. Accordingly, based on geographic location or zone control device 100 uses different control options (IR vs RF) to control the appliances present in the location/control zone.

We claim:

1. A control system comprising:
   at least one controllable appliance,
   a control device having a user interface that enables a user to control the at least one controllable appliance via user commands, and
   a remote information source that enables modifying a control functionality of the user interface; wherein
      the control device includes a communicator that is configured to receive context sensitive information transmitted from the remote information source in response to a location parameter associated with the control device that is communicated from the control device to the information source, and
      the control device is configured to modify a functionality of the user interface based on the context sensitive information.

2. The control system of claim 1, wherein the location parameter includes at least one of a location and an orientation.

3. The control system of claim 1, wherein
   the communicator is further configured to transmit operational commands based upon the user commands and the context sensitive information.

4. The control system of claim 1, wherein the control device further includes
   a local information source, and wherein
      the control functionality of the user interface is further modified based on the local information source and the location parameter.

5. The control system of claim 1, wherein the context sensitive information is further dependent upon at least one of: a temporal parameter, a user identification, a prior location parameter and a state of an object.

6. The control system of claim 1, wherein the control functionality of the user interface includes a control modality, and the remote information source effects a change in the control modality.

7. The control system of claim 1, wherein
   the one or more appliances include a first appliance at a first location, and a second appliance at a second location, and
   the remote information source is configured to provide the context sensitive information so as to include:
      controls for the first appliance when the location parameter indicates proximity to the first location, and
      controls for the second appliance when the location parameter indicates proximity to the second location.

8. The control system of claim 1, wherein the control device autonomously effects commands in dependence upon the location parameter.

9. The control system of claim 1, wherein the control device further includes a location sensor that provides the location parameter.

10. A control device for use in a control system having one or more appliances, the control device comprising
    a user interface that enables a user to control the at least one controllable appliance via user commands, and
    a communicator, operably coupled to the user interface, that is configured to receive context sensitive information transmitted from a remote information source in response to a location parameter associated with the control device communicated by the control device to the information source, and
    wherein the control device is configured to modify a control functionality of the user interface based on the context sensitive information.

11. The control device of claim 10, further including
    a location sensor, operably coupled to the communicator, that determines a location parameter associated with the control device.

12. The control device of claim 10, further including
    a local information source that is configured to further modify the control functionality of the user interface based on the location parameter.

13. The control device of claim 10, wherein the context sensitive information is further dependent upon at least one of: a temporal parameter, a user identification, a prior location parameter and a state of an object.

14. The control device of claim 10, wherein the communicator autonomously transmits default commands in dependence upon the context sensitive information.

15. An information source for use in a control system that includes a control device that is remote from the control system, and one or more appliances, the information source comprising:
    a receiver that receives a location parameter from the control device,
    a selector that provides context sensitive information for controlling the one or more appliances via the control device in dependence upon the location parameter, and
    a transmitter that transmits the context sensitive information to the control device to enable modifying a user interface of the control device to effect a control of the one or more appliances.

16. The information source of claim 15, wherein
    the receiver also receives operational commands from the control device, and
    the information source further includes
       a network access device that transmits control commands to one or more appliances via a network, to effect the control of the one or more appliances based upon the operational commands from the control device.

17. The information source of claim 15, wherein
    the selector selects the context sensitive information in further dependence upon at least one of: a temporal parameter, a user identification parameter, and a state parameter.

18. A method of providing location dependent control of an appliance to a user, the method comprising the steps of:
    determining a location of the user,
    receiving context sensitive information from a remote information source, based on the location of the user,
    providing a control functionality to the user in dependence upon the context sensitive information,
    receiving a user response from the user based on the control functionality, and
    communicating commands to the appliance based on the user response.

* * * * *